(12) United States Patent
Ahn

(10) Patent No.: US 8,326,354 B2
(45) Date of Patent: Dec. 4, 2012

(54) PORTABLE TERMINAL FOR EXPLAINING INFORMATION OF WINE AND CONTROL METHOD THEREOF

(75) Inventor: Sung Joon Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 12/647,365

(22) Filed: Dec. 24, 2009

(65) Prior Publication Data

US 2011/0009162 A1     Jan. 13, 2011

(30) Foreign Application Priority Data

Jul. 9, 2009  (KR) ....................... 10-2009-0062747

(51) Int. Cl.
*H04M 1/00*         (2006.01)

(52) U.S. Cl. .................. 455/556.1; 455/550.1; 455/557; 455/564; 455/566

(58) Field of Classification Search .... 455/414.1–414.4, 455/418, 550.1, 556.1–556.2, 557–558, 564, 455/566, 41.2–41.3, 66.1, 67.11, 90.3, 420, 455/517, 571.1, 575.8; 382/312–313, 305–307; 396/310, 313–314, 429; 709/203, 219; 348/14.02, 348/552; 283/72, 74, 81, 101; 252/138, 252/148, 166, 170, 176, 178
See application file for complete search history.

(56) References Cited

U.S. PATENT DOCUMENTS

| | | | | |
|---|---|---|---|---|
| 5,380,045 | A * | 1/1995 | Comann | 283/70 |
| 5,924,739 | A * | 7/1999 | Garbutt | 283/81 |
| 6,741,864 | B2 * | 5/2004 | Wilcock et al. | 455/456.1 |
| 7,438,322 | B2 * | 10/2008 | Miller | 283/81 |
| 7,447,362 | B2 * | 11/2008 | Lev | 382/200 |
| 7,490,773 | B2 * | 2/2009 | McVicker | 235/462.24 |
| 7,797,374 | B2 * | 9/2010 | Prince | 709/203 |
| 7,831,141 | B2 * | 11/2010 | Wassingbo et al. | 396/429 |
| 7,954,711 | B2 * | 6/2011 | Adstedt et al. | 235/385 |
| 7,992,181 | B2 * | 8/2011 | Furuhashi et al. | 725/105 |
| 2005/0154941 | A1 | 7/2005 | Lee et al. | |
| 2005/0252966 | A1 * | 11/2005 | Kulas | 235/383 |
| 2006/0120752 | A1 * | 6/2006 | McVicker et al. | 399/107 |
| 2006/0142054 | A1 | 6/2006 | Wang et al. | |
| 2008/0140432 | A1 * | 6/2008 | Fenn | 705/1 |
| 2008/0279481 | A1 * | 11/2008 | Ando | 382/306 |
| 2008/0306924 | A1 * | 12/2008 | Paolini et al. | 707/4 |
| 2010/0060955 | A1 * | 3/2010 | Saliba | 358/493 |

FOREIGN PATENT DOCUMENTS

| | | |
|---|---|---|
| EP | 1 503 325 A1 | 2/2005 |
| EP | 1 737 198 A2 | 12/2006 |

* cited by examiner

*Primary Examiner* — Meless Zewdu
(74) *Attorney, Agent, or Firm* — Birch, Stewart, Kolasch & Birch, LLP

(57) ABSTRACT

A mobile terminal including an output device configured to output information, a camera configured to captures an image of a wine label on a wine bottle; and a controller configured to extract wine identification information from a memory that corresponds to information included in the captured image of the wine label, and to output at least a portion of the extracted wine information on the output device.

18 Claims, 6 Drawing Sheets

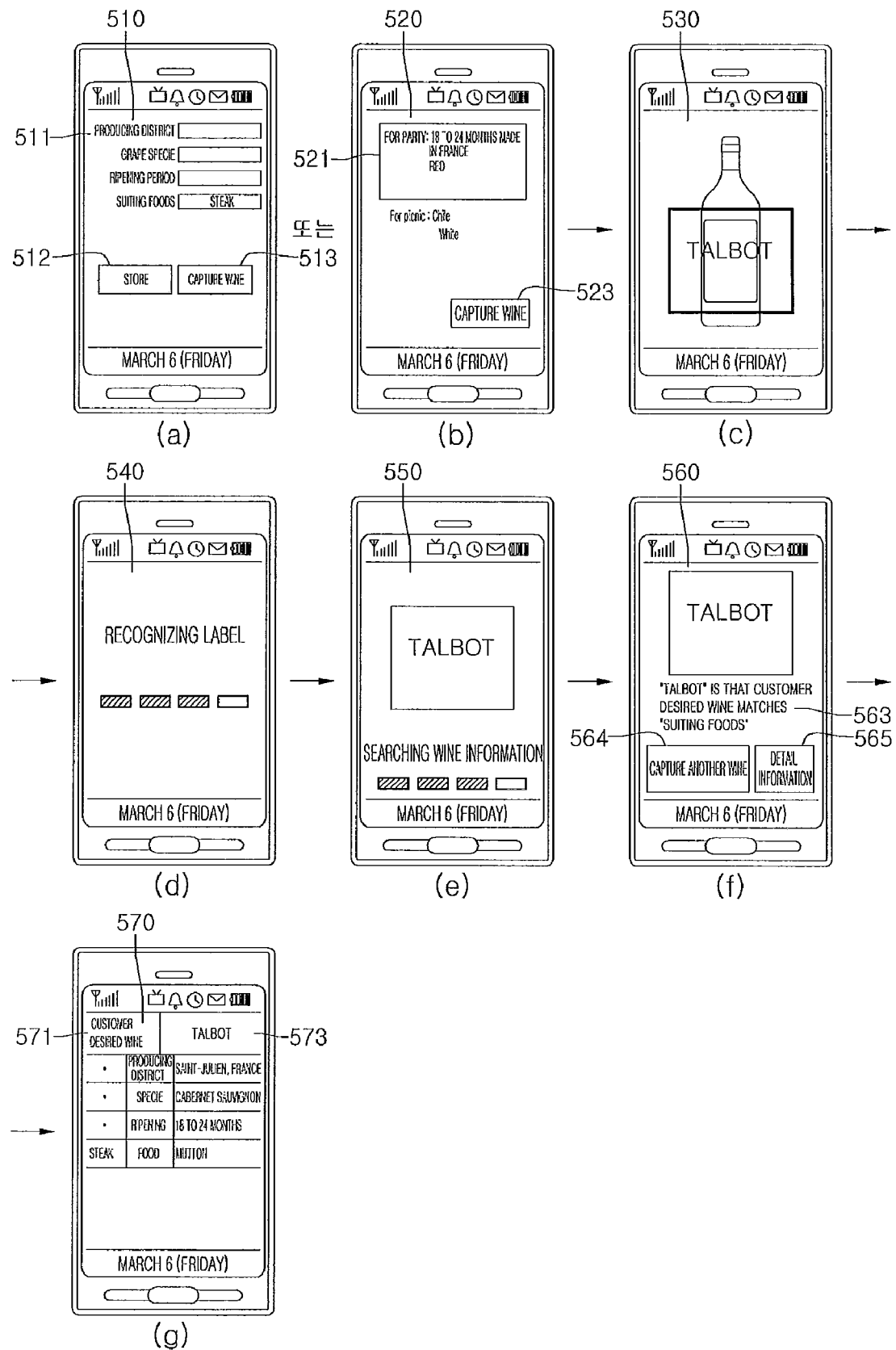

PORTABLE TERMINAL FOR EXPLAINING INFORMATION OF WINE AND CONTROL METHOD THEREOF

CROSS-REFERENCE TO A RELATED APPLICATION

Pursuant to 35 U.S.C. §119(a), this application claims the benefit of the earlier filing date and right of priority to Korean Application No. 10-2009-0062747, filed on Jul. 9, 2009, the contents of which are hereby incorporated by reference in their entirety

BACKGROUND OF THE INVENTION

1. Field of the Invention

The present invention relates to a mobile terminal and corresponding method for providing information about different wines to a user of the mobile terminal.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. In addition, mobile terminals can also receive broadcast and multicast signals, which permit viewing of content such as videos and television programs.

As mobile terminal are become more and more popular, users are tending to consider their mobile terminal as a necessity. Thus, manufactures of mobile terminals are increasingly adding new features to mobile terminals in an attempt to make the mobile terminals more user-friendly and fun to operate.

SUMMARY OF THE INVENTION

One object of the present invention is to provide a mobile terminal and corresponding method allowing a user to easily obtain information about wine using the mobile terminal.

To achieve these and other advantages and in accordance with the purpose of the present invention, as embodied and broadly described herein, the present invention provides in one aspect a mobile terminal including an output device configured to output information, a camera configured to capture an image of a wine label corresponding to a wine bottle, and a controller configured to extract wine identification information from a memory that corresponds to information included in the captured image of the wine label, and to output at least a portion of the extracted wine information on the output device.

In another aspect, the present invention provides a method of controlling a mobile terminal, and which includes capturing, via a camera on the mobile terminal, an image of a wine label corresponding to a wine bottle, extracting, via a controller on the mobile terminal, wine identification information from a memory that corresponds to information included in the captured image of the wine label, and outputting, via an output device included on the mobile terminal, at least a portion of the extracted wine information on the output device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 6 includes overviews of display screens illustrating features described in FIG. 5.

DETAILED DESCRIPTION OF THE INVENTION

Reference will now be made in detail to the preferred embodiments of the present invention, examples of which are illustrated in the accompanying drawings.

A mobile terminal may be implemented using a variety of different types of terminals. Examples of such terminals include mobile phones, smart phones, notebook computers, digital broadcast terminals, Personal Digital Assistants (PDA), Portable Multimedia Players (PMP), navigators and the like.

Figure 1:
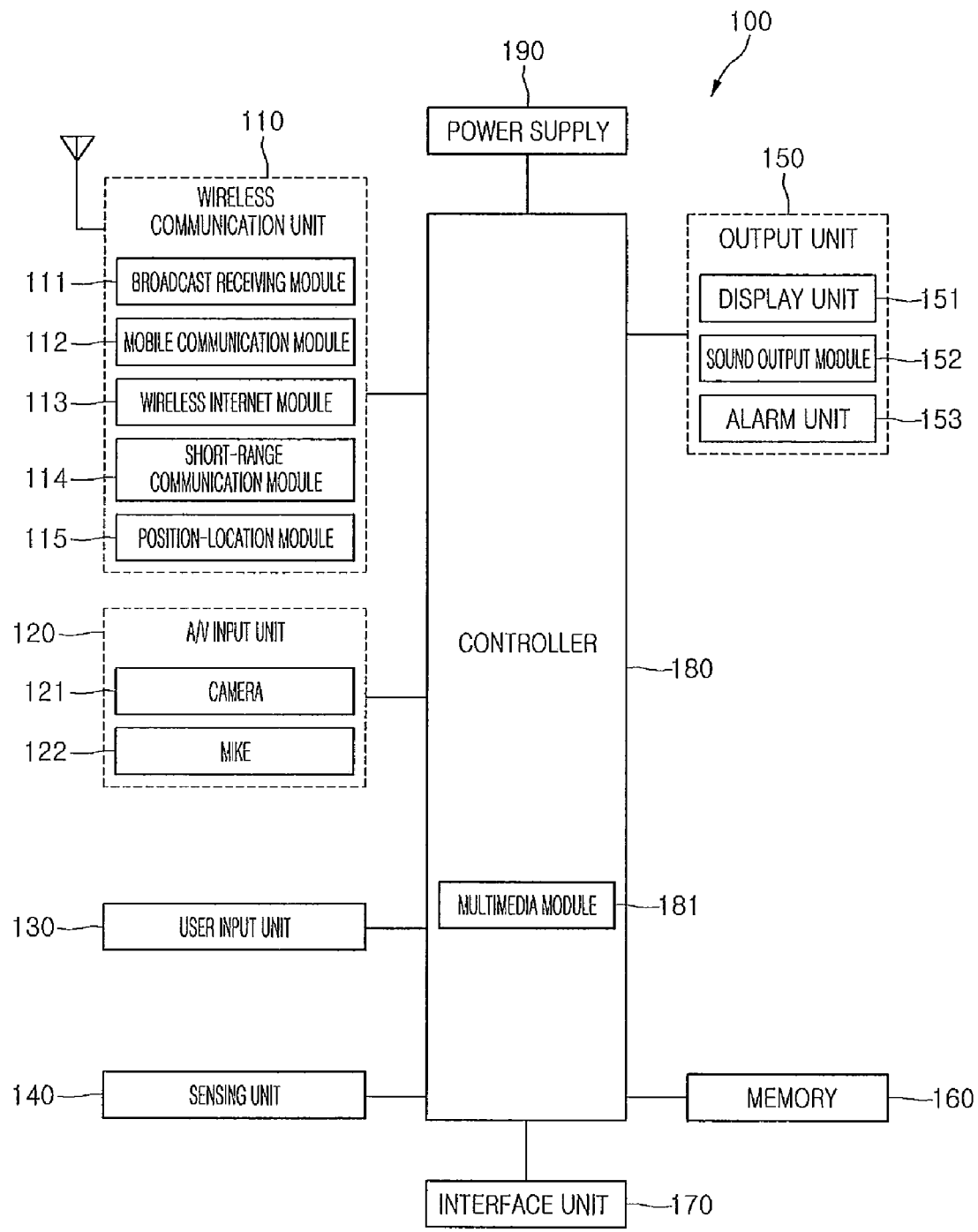
FIG. 1 is a block diagram of a mobile terminal according to an embodiment of the present invention.

FIG. 1 is a block diagram illustrating a mobile terminal according to one embodiment of the present invention. As shown, the mobile terminal 100 includes components such as a wireless communication unit 110, an Audio/Video (A/V) input unit 120, a user input unit 130, a sensing unit 140, an output unit 150, a memory 160, an interface unit 170, a controller 180, a power supply 190 and the like. Further, FIG. 1 shows the mobile terminal 100 having various components, but implementing all of the illustrated components is not a requirement. Greater or fewer components may alternatively be implemented.

In addition, the wireless communication unit 110 may include one or more components which permit wireless communications between the mobile terminal 100 and a wireless communication system or between the mobile terminal 100 and a network within which the mobile terminal 100 is located. For example, in FIG. 1, the wireless communication unit 110 includes at least one of a broadcast receiving module 111, a mobile communication module 112, a wireless Internet module 113, a short-range communication module 114 and a position location module 115.

The broadcast receiving module 111 receives a broadcast signal and/or broadcast associated information from an external broadcast managing entity via a broadcast channel. The broadcast channel may include a satellite channel and a terrestrial channel. Further, the broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information include information associated with a broadcast channel, a broadcast program, a broadcast service provider, and the like.

The broadcast signal may be implemented as a TV broadcast signal, a radio broadcast signal, and a data broadcast signal, among others. The broadcast signal may further include a data broadcast signal combined with a TV or radio broadcast signal. Also, the broadcast associated information may be provided via a mobile communication network, and received by the mobile communication module 112. In addition, the broadcast associated information may be implemented in various formats. For instance, broadcast associated information may include an Electronic Program Guide (EPG) of the Digital Multimedia Broadcasting (DMB) system, an Electronic Service Guide (ESG) of the Digital Video Broadcast-Handheld (DVB-H) system, and the like.

The broadcast receiving module 111 may be configured to receive digital broadcast signals transmitted from various types of broadcast systems. Such broadcast systems may include the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the like. The broadcast receiving module 111 may be configured to be suitable for all broadcast system transmitting broadcast signals as well as the digital broadcasting systems. Broadcast signals and/or broadcast associated information received via the broadcast receiving module 111 may also be stored in a suitable device, such as a memory 160.

Further, the mobile communication module 112 transmits/receives wireless signals to/from at least one of network entities (e.g., base station, an external mobile terminal, a server, etc.) on a mobile communication network. In addition, the wireless signals may include an audio call signal, video call signal, or various formats of data according to transmission/reception of text/multimedia messages. Also, the wireless Internet module 113 supports wireless Internet access for the mobile terminal, and may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

Further, the short-range communication module 114 denotes a module for short-range communications. Suitable technologies for implementing this module include BLUETOOTH, Radio Frequency IDentification (RFID), Infrared Data Association (IrDA), Ultra-WideBand (UWB), ZigBee, and the like. The position location module 115 denotes a module for detecting or calculating a position of a mobile terminal. An example of the position location module 115 includes a Global Position System (GPS) module.

In addition, the GPS module can receive position information in cooperation with associated multiple satellites. Further, the position information may include coordinates information represented by latitude and longitude. For example, the GPS module can measure an accurate time and distance respectively from more than three satellites so as to accurately calculate a current position of the mobile terminal based on such three different distances according to a triangulation scheme. A scheme may also be used to obtain time information and distance information from three satellites and correct error by one satellite. Specifically, the GPS module can further obtain three-dimensional speed information and an accurate time, as well as position on latitude, longitude and altitude, from the position information received from the satellites.

In addition, the A/V input unit 120 is configured to provide audio or video signal input to the mobile terminal. In FIG. 1, the A/V input unit 120 includes a camera 121 and a microphone 122. Further, the camera 121 receives and processes image frames of still pictures or video obtained by image sensors in a video call mode or a capturing mode. The processed image frames can then be displayed on a display 151.

Also, the image frames processed by the camera 121 may be stored in the memory 160 or transmitted to the exterior via the wireless communication unit 110. Two or more cameras 121 may be provided according to the configuration of the mobile terminal. The microphone 122 may receive an external audio signal via a microphone while the mobile terminal is in a particular mode, such as a phone call mode, a recording mode, a voice recognition mode, or the like. The audio signal is then processed into digital data, and the processed digital data is converted for output into a format transmittable to a mobile communication base station via the mobile communication module 112 for the phone call mode. The microphone 122 may also include assorted noise removing algorithms to remove noise generated in the course of receiving the external audio signal.

In addition, the user input unit 130 can generate input data input by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with a display unit 151 included in the output unit to be explained later so as to be in cooperation with the display unit 151, which is referred to as a touch screen. Further, the sensing unit 140 provides status measurements of various aspects of the mobile terminal. For instance, the sensing unit 140 can detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100.

For example, regarding a slide-type mobile terminal, the sensing unit 140 can sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. The sensing unit 140 may also include a proximity sensor.

In addition, the interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

In addition, the interface unit 170 can receive data from an external device, or be provided with power and accordingly transfer the received data or power to each component within the mobile terminal 100 or transfer data of the mobile terminal 100 to an external device. Also, the interface unit 170 can serve as a path for power to be supplied from an external cradle to the mobile terminal 100 when the mobile terminal 100 is connected to the external cradle or as a path for transferring various command signals inputted from the cradle by a user to the mobile terminal 100. Such various command signals and power input from the cradle may operate as a signal for recognizing that the mobile terminal 100 has accurately been mounted to the cradle.

The output unit 150 is configured to output an audio signal, a video signal or an alarm signal, and in FIG. 1, include the display unit 151, a sound output module 152, an alarm unit 153, and the like. Further, the display unit 151 can output information processed in the mobile terminal 100. For example, when the mobile terminal is operating in a phone call mode, the display unit 151 provides a User Interface (UI) or a Graphic User Interface (GUI) which includes information associated with the call. As another example, if the mobile terminal is in a video call mode or a capturing mode, the display unit 151 can additionally or alternatively display images captured and/or received, a UI, or GUI.

Meanwhile, as mentioned above, a touch screen can be configured as the display unit 151 and the touchpad are layered with each other to work in cooperation with each other. This configuration permits the display unit 151 to function both as an input device and an output device. The display unit 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays according to embodiments of the present invention can be configured to be transparent such that it is possible to see the exterior therethrough. These displays are called transparent displays. A representative example of the transparent display includes a Transparent Organic Light Emitting Diode (TOLED), and the like. Further, the mobile terminal 100 may include two or more of such display units 151. For example, the mobile terminal 100 may simultaneously include an external display and an internal display.

Further, the sound output module 152 can output audio or sound data, which is received from the wireless communication unit 110 in various modes including a call-receiving mode, call-placing mode, recording mode, voice recognition mode, broadcast reception mode, and the like, or audio or sound data stored in the memory 160. Also, the audio output module 152 can output an audio signal relating to a particular function (e.g., call received, message received, etc.) performed in the mobile terminal 100. The audio output module 152 can also be implemented using a speaker, a buzzer, or the like.

In addition, the alarm unit 153 may output a signal to inform a generation of event associated with the mobile terminal 100. Alarm events may include a call received, message received, user input received and the like. In addition to generating the audio or video signal, the alarm unit 153 can also inform the event generation in different manners, for example, by providing tactile sensations (e.g., vibration) to a user. The alarm unit 153 may also be configured to vibrate responsive to the mobile terminal receiving a call or message.

As another example, vibration can be provided by the alarm unit 153 responsive to receiving user input at the mobile terminal, thus providing a tactile feedback mechanism. Such vibration can also be provided to make a user recognize the event generation. The signal informing the event generation may also be output via the display unit 151 or the sound output module 152.

Further, the memory 160 may store a program for the processing and control of the controller 180, and temporarily store input/output data (e.g., phonebook data, messages, still images, video and the like). Also, the memory 160 may store data related to various patterns of vibrations and audio output upon the touch input on the touch screen. In addition, the memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

In addition, the controller 180 generally controls the overall operations of the mobile terminal. For example, the controller 180 performs the control and processing associated with voice calls, data communications, video calls, and the like. The controller 180 may also include a multimedia module 181, which provides multimedia playback. The multimedia module 181 may be configured as part of the controller 180 or as a separate component. The controller 180 can also perform a pattern recognition processing so as to recognize writing or drawing input on the touch screen as text or image. Further, the power supply 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The mobile terminal 100 may also be configured to operate within a communication system which transmits data via frames or packets, including both wireless and wireline communication systems, and satellite-based communication systems. Hereinafter, a communication system within which the mobile terminal related to the present invention can operate will be described with reference to FIG. 2. Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of a non-limiting example only, further description will relate to a CDMA communication system, but such teachings apply equally to other system types including the CDMA wireless communication system.

Figure 2:
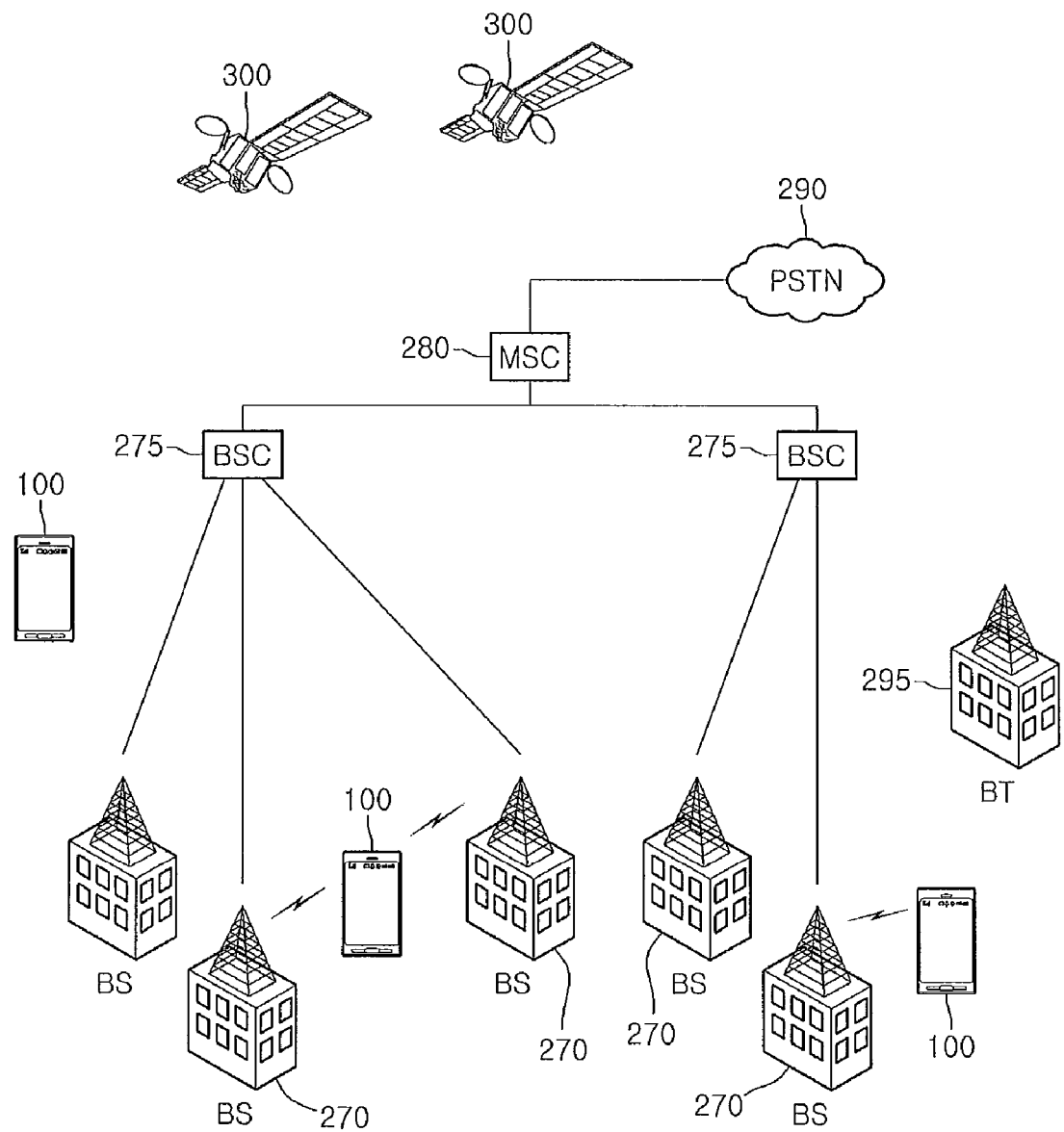
FIG. 2 is a block diagram of a wireless communication system in which the mobile terminal can be operated according to an embodiment of the present invention.

Referring now to FIG. 2, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2.

Each base station 270 may include one or more sectors, each sector having an omni-directional antenna or an antenna pointed in a particular direction radially away from the base station 270. Alternatively, each sector may include two or more different antennas. Each base station 270 may also be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some instances, the term "base station" may be used to refer collectively to a BSC 275, and one or more base stations 270. The base stations may also be denoted as "cell sites." Alternatively, individual sectors of a given base station 270 may be referred to as cell sites. A broadcasting transmitter (BT) 295, as shown in FIG. 2, transmits a broadcast signal to the mobile terminals 100 operating within the system. The broadcast receiving module 111 (FIG. 1) can also be configured inside the mobile terminal 100 to receive broadcast signals transmitted by the BT 295.

FIG. 2 further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1) can also be configured to cooperate with the satellites 300 to obtain desired position information. Other types of position detection technology, (i.e., location technology that may also be used in addition to or instead of GPS location technology) may alternatively be implemented. Further, at least one of the GPS satellites 300 may alternatively or additionally be configured to provide satellite DMB transmissions.

During an operation of the wireless communication system, the base stations 270 receive sets of reverse-link signals from various mobile terminals 100. The mobile terminals 100 are engaging in calls, messaging, and executing other communications, and each reverse-link signal received by a given base station 270 is processed within that base station 270. The resulting data is then forwarded to an associated BSC 275. Further, the BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Figure 3:
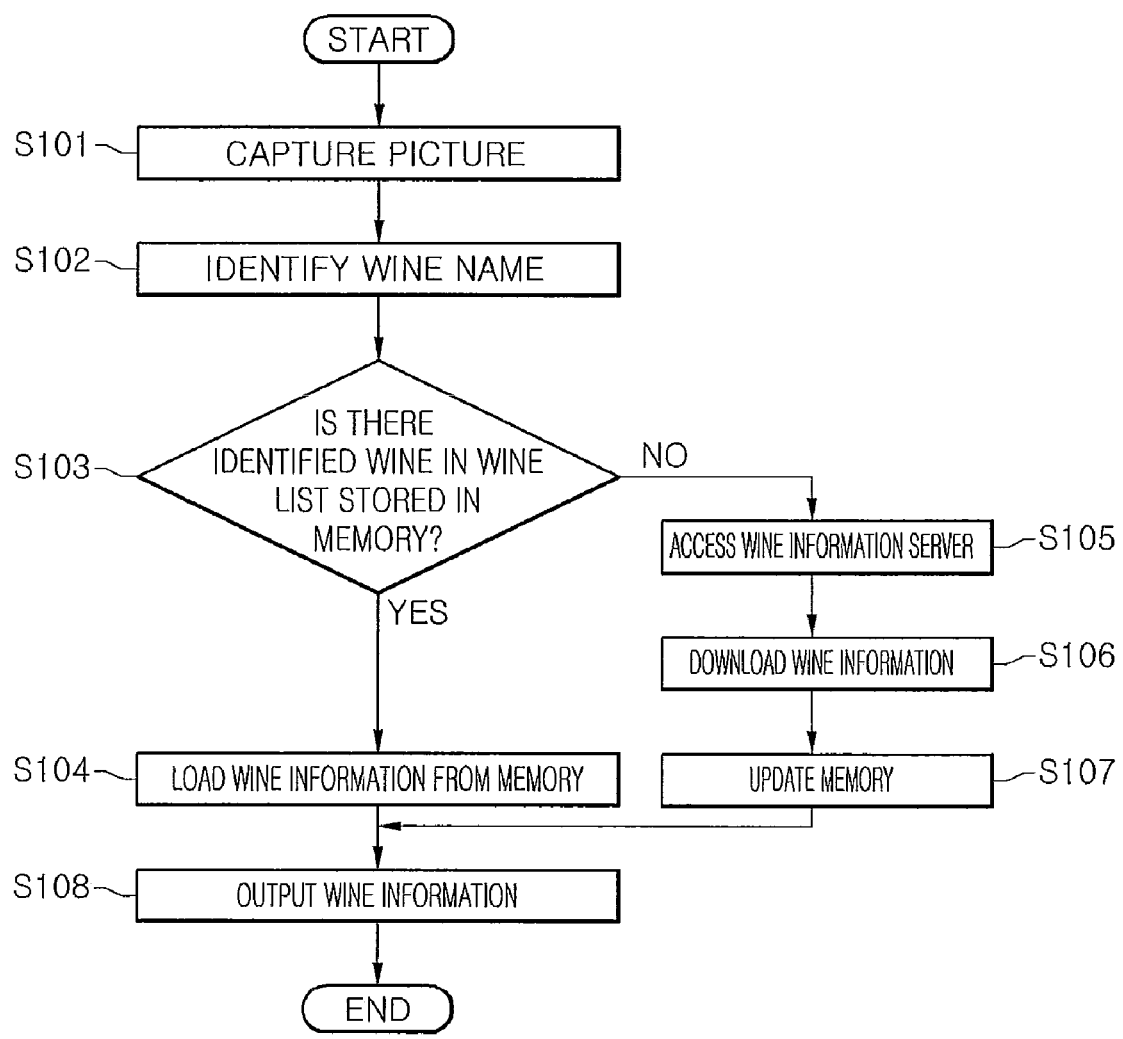
FIG. 3 is a flowchart illustrating a method of controlling a mobile terminal according to an embodiment of the present invention.

Next, FIG. 3 is a flowchart showing a method of controlling the mobile terminal 100 according to an embodiment of the present invention. FIG. 1 will also be referred to throughout the rest of the description of the present invention. As shown in FIG. 3, the user of the mobile terminal 100 captures an image of a specific wine that he or she wants to know more about (S101). For example, the user can be in grocery store and see a bottle wine that he or she is interested in purchasing or is interested in learning more about the particular wine. In this instance, the user can use the camera 121 to capture an image of the label on the wine bottle. The label may also be separated from the wine bottle and be used to order a particular wine (e.g., a wine that is currently not stocked).

In addition, the wine label includes identification information such as a name, a character, picture, etc., which identifies the wine. Further, one embodiment of the present invention advantageously allows the user to operate the camera 121 in a wine capturing mode for easily capturing the wine image including the label, etc., and which will be discussed in more detail later with respect to FIG. 4.

The camera 121 can also be used in a moving image picture capturing mode to capture a moving image of the wine bottle or in a still image picture capturing mode to capture a still image of the wine bottle. For the moving image picture capturing mode, the controller 180 selects at least one of a plurality of frames forming the moving picture and can use the captured frame or frames as an image for recognizing the wine. In addition, the wine capturing mode may be selectively provided together with the still picture capturing mode and the moving picture capturing mode. For example, the user can activate menus associated with the camera 121 including at least one of the wine capturing mode, the picture capturing mode, and the moving picture photographing mode. Further, a currently captured image or an image previously stored in the memory 160 or stored in a detachable external memory can be used.

As shown in FIG. 3, the controller 180 recognizes the identification information identifying the wine from the captured image (S102). Further, the identification information includes at least any one of some or all of the character trademarks and the picture trademarks that are marked on the label of the wine. The controller 180 can also recognize the identification information using an image analysis algorithm included in the mobile terminal 100. That is, the image analysis algorithm recognizes characters, symbols, etc., from the wine image and converts recognized information into predetermined text data or image data form.

For example, the image analysis algorithm can extract text data corresponding to the wine name (e.g., "Talbot," which is a name of a wine) from the wine image. The image analysis algorithm can also be stored in the memory 160 or stored in an external memory that is attached to the mobile terminal 100 through the interface 170 (e.g., a memory stick, etc.). When the image analysis algorithm is stored in the external memory, the controller 180 loads the image analysis algorithm stored in the external memory to perform the analysis of the wine image.

In addition, as shown in FIG. 3, the controller 180 determines if the identification information of the wine is included in a wine list stored in a wine database (DB) in the memory

160 (S103). Further, the wine DB can include at least one table having information corresponding to types of identification information (a character trademark, a picture trademark, etc. of the wine). The wine DB can also include a unique ID value corresponding to a particular wine.

Further, the wine DB can also include information associated with the wine such as the wine name, a wine label image, the type of wine (e.g., Merlot), the producer of the wine, the import source of the wine, the producing district, the producing country, the preferred drinking temperature, a drinking method, the grape species, a taste, a flavor, foods to eat with the wine, a history of the wine, the recommended price of the wine, etc. The stored wine information can be stored as text or image data and sound data. Further, when the wine information is stored as image data, the image data can be displayed together with the text data on the display unit 151. When the wine information is stored as the sound data, the sound output module 152 can out the stored sound data.

In addition, the wine DB can be stored in an external memory rather than or in addition to the memory 160. Thus, because the external memory can store data having a relatively larger capacity as compared to the memory 160, the external memory can store a greater variety of types of wine information. In addition, the wine DB can be included in a memory of an external terminal. In this instance, the mobile terminal 100 can connected to the external terminal using the wireless communication unit 110. For example, the mobile terminal 100 can connect to the external terminal using the short-range communication module 114 such as Bluetooth, RFID, infrared communication, UWB, ZigBee, etc. and then use the wine DB stored in the memory of the external terminal. In addition, the wine DB can also be maintained in a predetermined web server. In this instance, the mobile terminal 100 can access the predetermined web server through the Internet to read the wine information.

Referring to FIG. 3, when the controller 180 determines there is wine identification information in the wine DB (Yes in S103), the controller 180 reads the wine identification information from the wine DB (S104). The controller 180 then outputs the wine information read from the wine DB on the display unit 151 and/or the sound output module 152 (S108). When the controller 180 determines there is no wine identification information in the wine DB (No in S103), the controller 180 accesses a predetermined wine information server using the wireless communication unit 110 (S105). In addition, the wine information server can be a predetermined web server, a server connected to a social network site (SNS), a blog, a micro blog, an instant messenger, etc., that the controller 180 can use to determine the wine information.

Further, wine information not stored in the wine DB can be provided by the wine information server. In other words, the wine DB of the wine information server can include additional data that is not included in the wine DB stored in the memory 160 of the mobile terminal, for example. Then, as shown in FIG. 3, the controller 180 transmits the identification information data to the wine information server via the wireless communication unit 110, the wine information server searches the wine information corresponding to the received identification information and transmits the searched wine information to the wireless communication unit 110 (S106). That is, the controller 180 receives the wine information downloaded from the wine information server.

The controller 180 then stores the wine information downloaded from the wine information server in the storage unit (S107) and outputs the downloaded information using the display unit 151 and/or the sound output module 152 (S108). Also, when there is no wine information corresponding to the identification information in the wine information server, the wine information server can transmit an error message to the mobile terminal 100, and the mobile terminal 100 can output a message notifying the user the wine information is not available on the server.

In addition, the controller 180 can also read the data corresponding to the extracted identification information from the external memory in which the wine DB is stored or from a memory in the external terminal. For example, the controller 180 can be connected to the external terminal using the short-range communication module 114 and can read the data of the wine DB stored in the memory of the external terminal.

Further, the wine DB may be periodically or non-periodically updated. For example, the controller 180 can periodically access the wine information server, etc., to receive the updated wine information that is not included in the existing wine DB. The updated process may be automatically periodically performed and be performed when the user uses the wine description function according to an embodiment of the present, that is, to be non-periodically performed.

In addition, the wine DB may be directly updated by the user. In more detail, the user can store new wine information in the wine DB using the user input unit 100. For example, when there is no wine information corresponding to the identification information in the wine DB, the controller 180 can display menus allowing the user to select whether or not the wine information is updated or to directly input wine information. That is, the user can select an appropriate menu to directly input the wine information into the wine DB. Thus, in this embodiment, the user can add personal information about how he or she feels about the wine (e.g., an excellent wine, a poor wine, etc.)

Thus, according to an embodiment of the present invention, the detailed information of the wine can be accurately obtained using only the label of the specific wine captured by the camera 121, making it possible to accurately choose a desired wine. In addition, wine can become more popular because the user can get information that helps them purchase a desired wine. Further, when the wine DB is provided in the external memory, the external memory can be separately stored and managed, making it possible to maximize the user convenience.

Figure 4:
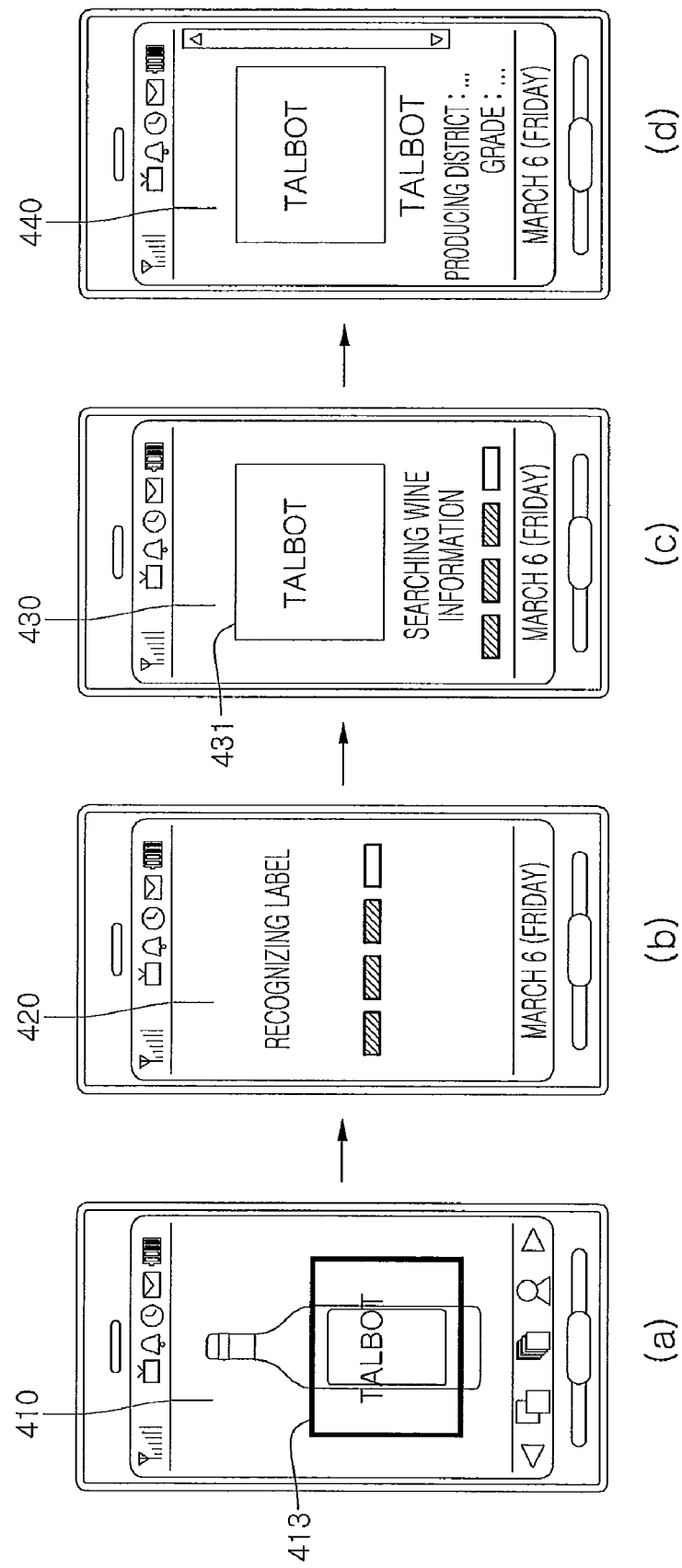
FIG. 4 includes overviews of display screens illustrating features described in FIG. 3.

Next, one example of the process for providing wine information using the mobile terminal 100 according to an embodiment of the present invention will be described in detail with reference to FIG. 4. In particular, FIG. 4 illustrates features regarding operating the camera in the wine capturing mode. As shown in FIG. 4, the controller 180 controls the display unit 151 to display a wine capturing mode screen 410, a wine identification screen 420, a wine information search screen 430, and a wine information screen 440. The screens 410, 420, 430 and 440 are illustrated by way of example only and therefore are not limited to the particular arrangements. That is, the screens can be changed, deleted and added within the scope of the present invention. As shown in FIG. 4, the controller 180 also controls the display unit 151 to display a guide 413 that is used to focus on the label of the wine bottle.

Thus, with respect to FIG. 4(*a*), the user takes a picture of the wine label using the wine capturing mode. To more accurately recognize the identification information of the wine, the controller 180 advantageously displays the guide 413, which the user uses to focus on the label of the wine. In this example, the guide 413 includes a box shape surrounding the label, but other shapes can be used. The user then takes the picture of the label by controlling the angle of the camera 121 so that the label of the wine is located inside the guide 413.

As shown in FIG. 4(b), when the user takes the picture of the label, the controller 180 extracts the identification information of the wine from the wine image and displays the wine identification screen 420 on the display unit 151 to inform the user the label is being recognized. The wine identification screen 420 can also be selectively provided. For example, the controller 180 can convert the wine capturing mode screen 410 to the wine information search screen 430 without first providing the wine identification screen 420. In this instance, the step S102 in FIG. 3 can be performed while the wine information search screen 430 is displayed.

When the extraction process of the identification information completes, the controller 180 displays the wine information search screen 430 together with extracted identification information data 431 on the display unit 151 as shown in FIG. 4(c). The controller 180 can also display information indicating the wine information is being searched. The controller 180 also determines if there is wine information corresponding to the extracted identification information in the wine DB of the storage unit. Then, as shown in FIG. 4(d), when there is available wine information, the controller 180 displays the extracted wine information. The controller 180 can also output the extracted wine information using the sound output module 152. If there is no available wine information, the controller 180 can output information indicating there is no available wine information. Thus, the user can obtain detailed information of his/her desired wine.

Figure 5:
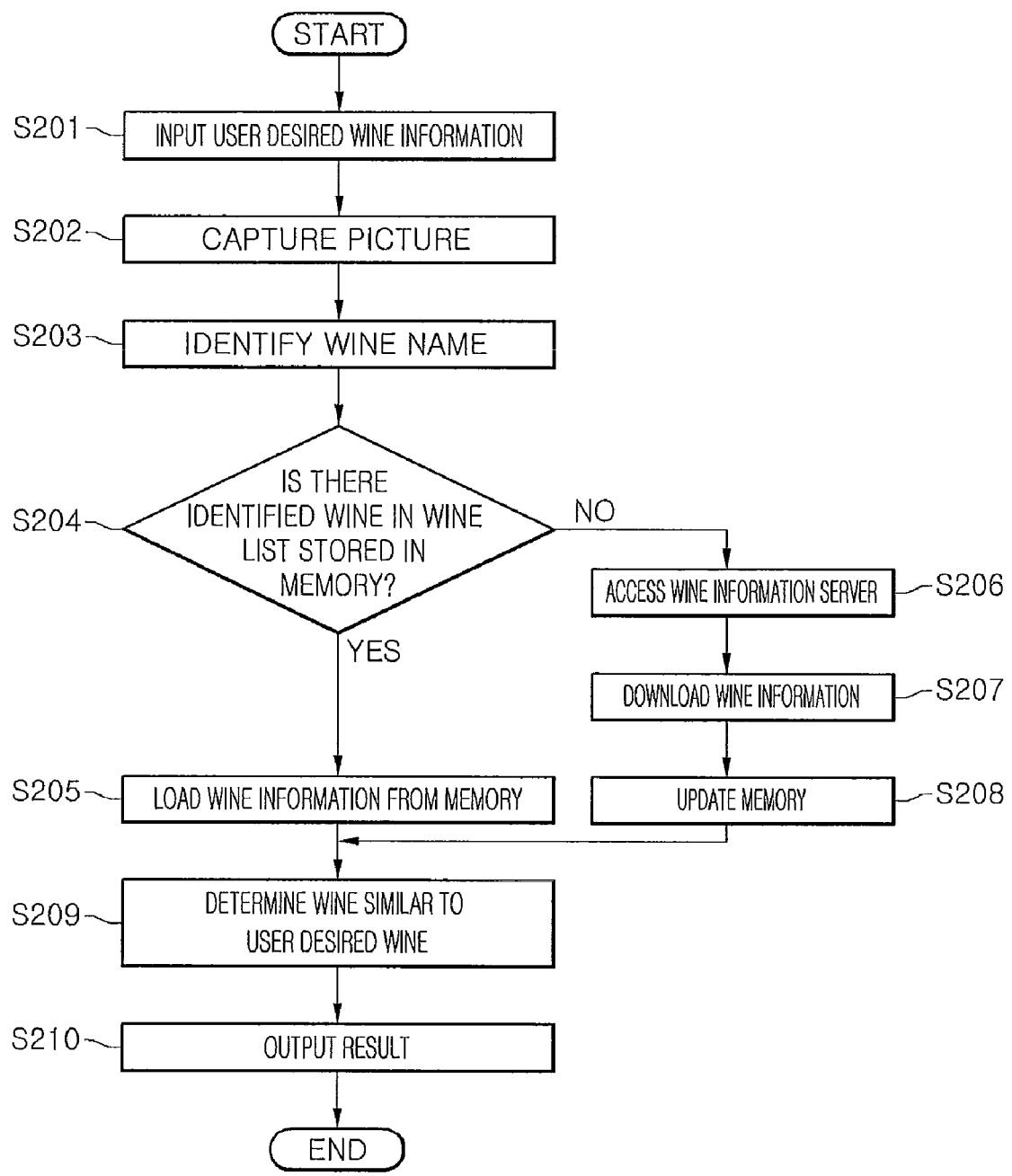
FIG. 5 is a flowchart illustrating a method of controlling a mobile terminal according to another embodiment of the present invention.

Next, FIG. 5 is a flowchart illustrating a method of controlling a mobile terminal according to another embodiment of the present invention. As shown in FIG. 5, the user first inputs wine information (first wine information) that the user would like to purchase using the user input unit 130 (S201). Further, the input wine information may be various types of wine information such as a wine name, a type of wine, a producer of the wine, an import source of the wine, a producing district and/or country of the wine, the preferred drinking temperature, the preferred drinking method, the type of grapes used to make the wine, the taste of the wine, the flavor of the wine, preferable foods to eat with the wine, etc.

The controller 180 can also search the wine DB for the input information and displays any found information on the display unit 151. In addition, the first wine information can be previously established in the memory 160 or the external memory and can be provided so that the user can select the previously established wine information. Further, the wine information input from the user can be temporarily stored in the memory 160.

The controller 180 then performs the steps S202-S208, which are the same as the steps S102-S107 in FIG. 3 and thus a detailed description of these steps is omitted. Thus, using the above steps, the user obtains captured wine information (second wine information). The controller 180 then compares the first wine information with the second wine information (S209). In more detail, the controller 180 compares the first and second wine information using a wine comparison algorithm and determines whether the wine captured by the user (second wine information) matches the wine wanted to be purchased by the user (first wine information).

Further, the wine comparison algorithm can be implemented to determine whether the first wine information completely matches the second wine information as well as to determine similarities between the input information. For example, when the user inputs wine manufactured by a grape of A species, and if the wine information of the captured image is manufactured by a grape of B species similar to the A species, the wine comparison algorithm can be implemented to indicate the similarity between the A and the B species. The controller 180 then outputs the determination result through the display unit 151 and/or the sound output module 152 (S210). Thus, in the second embodiment, the user can determine if a wine they want to purchase is similar or the same as a wine they are currently viewing.

Next, FIG. 6 includes overviews of display screens illustrating features shown in FIG. 5. As shown in FIG. 6, the controller 180 displays a wine information input screen 510 that the user can use to input wine information to be purchased by the user. In the example shown in FIG. 6(a), the input screen 510 include fields 511 for wine producing district, grape species, ripening period, and preferably foods to eat with a wine. A variety of other fields can also be displayed in the input screen 510, and the user can customize the input screen 510 to include fields they want displayed in the input screen 510. The controller 180 can also read a variety of wine information from the wine DB or the memory 160 to configure the wine information input screen 510.

In the example in FIG. 6(a), the user has input "steak" in the preferred food to eat with a wine. The controller 180 also display a store icon 512 that the user can select to store the input information, and a capture image icon 513 that the user can select to capture an image of a particular wine and to display the screen 520 in FIG. 6(b). When the user selects the storage button 512, the input information is stored in the storage unit, which can be used in the wine type select screen 520 later.

Then, as shown in FIG. 6(b), when the user selects the capture wine icon 513, the controller 180 displays the wine type select screen 520 including information about wines that match the entered food type. In the example shown in FIG. 6(b), the controller 180 displays information for both a party and a picnic. As shown in FIG. 6(b), the controller displays a red wine made in France for the party in a window 521, and a white wine made in Chile for the picnic. The controller 180 also displays a capture wine icon 523.

In addition, the controller 180 can also selectively provide the wine type select screen 520 and the wine information input screen 510. Also, the wine type select screen 520 is configured so that previously established wine types stored in the memory 160 or the external memory can be display such that the user can select at least one of the displayed wines. For example, the types of wine may be stored according to the usage of wine. Further, the wine capturing button 523 performs the same function as the wine capturing button 513 in FIG. 6(a).

Then, after the controller 180 displays wine information as shown in FIG. 6(b), user can capture a picture of wine they want to purchase as shown in a display screen 530 in FIG. 6(c). After the user takes the picture of the wine, the controller 180 displays a screen 540 indicating the label of the wine is being identified as shown in FIG. 6(d), searches for the wine having the information shown on the label, and displays a screen 550 indicating to the user that the wine is being searched for as shown in FIG. 6(e).

The controller 180 then compares the first wine information with the second wine information corresponding to the captured image and displays a screen 560 indicating to the user results of the comparison as shown in FIG. 6(f). In the example shown in FIG. 6(f), the screen 560 includes information 563 indicating the captured wine matches the wine information input by the user. The controller 180 can also output audio information regarding the comparison result via the sound output module 152. Further, as shown in FIG. 6(f), the controller 180 also displays a capture icon 564 that the user can select to capture an another wine bottle, and a detailed information icon 565 that the user can select to obtain more detailed information about the comparison result. If the wines did not match, the controller 180 can output information indicating the wines did not match. Also, FIG. 6(g) illustrates the controller 180 displaying a screen 570 that includes information 571 identifying the user-input desired wine information and a name 573 of the captured wine after the user selected the detailed information icon 565 in FIG. 6(f). Thus, the user can determine if the wine they captured is close to or the save as a wine they want.

In addition, embodiments of the present invention can be implemented as computer-readable codes in media in which programs are recorded. The computer-readable recording media includes all types of recording apparatuses in which data readable by a computer system is stored. Examples of the computer-readable recording media include a ROM, a RAM, a CD-ROM, a magnetic tape, a floppy disk, an optical data storage, etc., and in addition, include a recording medium and Internet transmissions. In addition, the computer may include the controller 180 of the mobile terminal 100.

Further, the user can access the wine DB stored in the memory 160 or the external memory even though the images are not captured. That is, the controller 180 can display a separate UI and use an algorithm that searches and modifies the contents of the wine DB. In more detail, the controller 180 can display the wine list stored in the wine DB on the display unit 151 according to the selection of the user or the search conditions. When the user selects the wine to be updated in the displayed wine list, the controller 180 displays the wine information corresponding to the selected wine on the display unit 151 and uses the user input unit 130 to enable the user to modify or delete the displayed wine information. In addition, the wine information having the new identification information can then be stored in the wine DB.

In addition, the wine DB stored in the memory 160 may be uploaded to the wine information server, a social network site, a blog, a micro blog, or an instant messenger, etc., according to the selection of the user. The wine DB uploaded by the user can also be stored in the memory, which is provided in the wine information server, etc., together with an identification code capable of identifying the user performing the uploading. The wine information server can also provide the list of the uploaded wine DB to another user accessing the wine information server, etc., and the other user can select the wine DB to be downloaded in the list.

In addition, the wine DB stored in the memory 160 may be transmitted to the external terminal by the wireless communication unit 110 according to the selection of the user. For example, the mobile terminal 100 can be connected to the external terminal using the short-range communication module 114 such as Bluetooth, RFID, infrared communication, UWB, ZigBee, etc., and may transmit the wine DB data receiving instructions and the data stored in the wine DB to the external terminal. The external terminal can then receive the wine DB data stored in the memory 160 according to the instructions received from the mobile terminal 100 and store them in the memory in the external terminal.

Thus, according to embodiments of the present invention, the user can obtain detailed information of wines by only capturing the images of wine that the user wants to know about, and the user can then more easily choose a desired wine. In addition, embodiments of the present invention increase the user's understanding when purchasing wine, which ultimately increases the amount of wine sold. Further, embodiments of the present invention can help the user choose a wine that matches their desired taste by comparing the user's taste with the detailed information of wine. The detailed information of wine can also be separately stored in the memory 160 of the terminal 100 or in an external memory, thus increasing the user's convenience when purchasing wine.

Further, the above description refers to wine, which is liquor made by fermenting grape. The wine may be sorted into Sparkling Wine and Non-Sparkling Wine according to the presence and absence of carbonic acid gas, Fortified Wine and Unfortified Wine according to the addition of alcohol or not, and Red Wine, White Wine, Rose Wine, Yellow Wine, etc. according to the color of the wine. In addition to these sorting methods, the wine may be variously sorted according to meal usage, taste, ripening period, etc.

In addition, the taste and smell of wines various greatly according to a producer, a producing district, a raw material, a soil condition, production years, vintage of grape, sugar content, etc. Thus, according to embodiments of the present invention, the user can choose a wine that matches his or her desired wine. Also, the wine information provided on a label generally does not include detailed information such as foods to eat with wine, etc. However, according to embodiments of the present invention, the user can easily view more detailed information about a desired wine by simply capturing the image of the label. The controller 180 then automatically provides more detailed information as discussed above.

Further, the mobile terminal may be implemented in a variety of different configurations. Examples of such configurations include a folder type, slide type, bar type, rotating type, swing type or the like.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:
1. A mobile terminal, comprising:
an output device including a display unit configured to output information;
a camera configured to be operated in a wine capturing mode in which a guide box is displayed on the display unit to guide a wine label of a wine bottle to be located within the guide box; and
a controller configured to:
output a graphical user interface on the display unit allowing a user to input desired wine information;
receive the user input desired wine information;
capture an image of the wine label displayed on said wine bottle;
extract wine identification information by recognizing at least one of characters and symbols from the captured image of the wine label;
convert the recognized at least one of characters and symbols into a predetermined text data or image data form;
read wine information from a memory that corresponds to the extracted wine identification information;
determine that the wine information read from the memory matches with the user input desired wine information; and
display the determined information; on the display unit of the mobile terminal information; indicating whether or not the read wine information matches the user input desired wine information.

2. The mobile terminal of claim 1, wherein the memory includes at least one of a memory in the mobile terminal, a detachable external memory that is connected to an interface of the mobile terminal, and a memory in an external terminal.

3. The mobile terminal of claim 1, wherein the controller is further configured to compare the extracted wine identification information with the wine identification information in the memory.

4. The mobile terminal of claim 3, wherein when the controller determines there is not wine identification information in the memory that matches to or is similar with the extracted wine identification information, the controller is further configured to output information indicating there is no available wine identification information in the memory.

5. The mobile terminal of claim 1, wherein when the controller determines there is not wine identification information in the memory that matches to or is similar with the extracted wine identification information, the controller is further configured to access an external wine server to read the wine information from the external server.

6. The mobile terminal of claim 1, wherein the wine information stored in the memory is periodically updated.

7. The mobile terminal of claim 1, wherein the wine information stored in the memory is directly added, modified, and deleted by a user.

8. The mobile terminal of claim 1, wherein the extracted wine identification information output to the output device includes at least one of a name of the wine, a type of the wine, a producer of the wine, an import source of the wine, a producing district of the wine, a producing country of the wine, a preferred drinking temperature of the wine, a method of drinking the wine, a grape species of the wine, a taste of the wine, a flavor of the wine, foods to eat with the wine, a history of the wine and a recommended price of the wine.

9. The mobile terminal of claim 1, wherein after the controller displays the graphical user interface on the display unit allowing the user to input the desired wine information, the controller is further configured to display a first display screen in which only the guide box is displayed in the first display screen, to display a second display screen indicating the controller is currently trying to recognize the wine label, to display a third display screen displaying an image of the recognized wine label including information that the controller is searching for the recognized wine label, and to display a fourth display screen displaying results of the searched wine label.

10. A method of controlling a mobile terminal, the method comprising:
  capturing, via a camera on the mobile terminal, at least one wine image in a wine capturing mode in which a guide box is displayed on a display unit of the mobile terminal to guide a wine label to be located within a specific area of the display unit;
  outputting, via a controller of the mobile terminal, a graphical user interface on the display unit allowing a user to input desired wine information;
  receiving the user input desired wine information;
  capturing an image of the wine label on a wine bottle
  extracting wine identification information by recognizing at least one of characters and symbols from the wine image;
  converting the at least one of the recognized characters and symbols into predetermined text data and image data form;
  reading wine information from a memory that corresponds to the extracted wine identification information;
  determining if that the wine information read from the memory matches with the user input desired wine information; and
  displaying the determined information on the display unit of said mobile terminal indicating whether or not the read wine information matches the user input desired wine information.

11. The method of claim 10, wherein the memory includes at least one of a memory in the mobile terminal, a detachable external memory that is connected to an interface of the mobile terminal, and a memory in an external terminal.

12. The method of claim 10, further comprising:
  comparing, via the controller, the extracted wine identification information with wine identification information in the memory.

13. The method of claim 12, wherein when the comparing step determines there is not wine identification information in the memory that matches to or is similar with the extracted wine identification information, the method further comprises outputting, via the controller, information indicating there is no available wine identification information in the memory.

14. The method of claim 10, wherein when the extracting step determines there is not wine identification information in the memory that matches to or is similar with the extracted wine identification information, the method further comprises accessing, via the controller, an external wine server to read the wine information from the external server.

15. The method of claim 10, wherein the wine information stored in the memory is periodically updated.

16. The method of claim 10, wherein the wine information stored in the memory is directly added, modified, and deleted by a user.

17. The method of claim 10, wherein the extracted wine identification information output to the output device includes at least one of a name of the wine, a type of the wine, a producer of the wine, an import source of the wine, a producing district of the wine, a producing country of the wine, a preferred drinking temperature of the wine, a method of drinking the wine, a grape species of the wine, a taste of the wine, a flavor of the wine, foods to eat with the wine, a history of the wine and a recommended price of the wine.

18. The method of claim 10, wherein after displaying the graphical user interface on the display unit allowing the user to input the desired wine information, the method further comprises displaying a first display screen in which only the guide box is displayed in the first display screen, displaying a second display screen indicating the controller is currently trying to recognize the wine label, displaying a third display screen displaying an image of the recognized wine label including information that the controller is searching for the recognized wine label, and displaying a fourth display screen displaying results of the searched wine label.

* * * * *